(12) United States Patent
Balabine

(10) Patent No.: US 10,771,347 B2
(45) Date of Patent: Sep. 8, 2020

(54) METHOD, APPARATUS, AND COMPUTER-READABLE MEDIUM FOR DATA BREACH SIMULATION AND IMPACT ANALYSIS IN A COMPUTER NETWORK

(71) Applicant: Informatica LLC, Redwood City, CA (US)

(72) Inventor: Igor Balabine, Menlo Park, CA (US)

(73) Assignee: Informatica LLC, Redwood City, CA (US)

( * ) Notice: Subject to any disclaimer, the term of this patent is extended or adjusted under 35 U.S.C. 154(b) by 222 days.

(21) Appl. No.: 16/031,621

(22) Filed: Jul. 10, 2018

(65) Prior Publication Data

US 2020/0021496 A1 Jan. 16, 2020

(51) Int. Cl.
*H04L 29/06* (2006.01)
*H04L 12/24* (2006.01)
*G06F 21/57* (2013.01)
*G06Q 40/08* (2012.01)

(52) U.S. Cl.
CPC .......... *H04L 41/145* (2013.01); *G06F 21/577* (2013.01); *G06Q 40/08* (2013.01); *H04L 63/1433* (2013.01); *H04L 63/1441* (2013.01); *G06F 2221/034* (2013.01)

(58) Field of Classification Search
CPC ............... H04L 41/145; H04L 63/1433; H04L 63/1441; G06F 21/577; G06F 2221/034; G06Q 40/08

USPC .......................................................... 726/25
See application file for complete search history.

(56) References Cited

U.S. PATENT DOCUMENTS

| 9,473,522 | B1 * | 10/2016 | Kotler | H04L 63/1433 |
| 10,243,904 | B1 * | 3/2019 | Wescoe | H04L 63/1433 |
| 2014/0089039 | A1 * | 3/2014 | McClellan | G06Q 10/0635 705/7.28 |
| 2014/0278664 | A1 * | 9/2014 | Loomis | G06Q 50/265 705/7.17 |

* cited by examiner

*Primary Examiner* — Michael S McNally
(74) *Attorney, Agent, or Firm* — Amardeep S. Grewal; Reed Smith LLP

(57) ABSTRACT

A system, method and computer-readable medium for data breach simulation and impact analysis in a computer network, including generating an exposure matrix corresponding to data stores connected to the computer network, the exposure matrix storing a correspondence between regulations and an exposure of each data store the regulations, generating approximation matrices from the exposure matrix by iteratively applying a data compression algorithm to the exposure matrix, each successive iteration of the data compression algorithm being configured to more closely approximate the exposure matrix than a previous iteration of the data compression algorithm, simulating a plurality of data breach and mitigation scenarios on the plurality of data stores based at least in part on the plurality of approximation matrices to determine an overall impact of each data breach and mitigation scenario, determining an optimal data breach and mitigation scenario in the plurality of data breach and mitigation scenarios.

19 Claims, 18 Drawing Sheets

| Regulation | Description | Penalties |
|---|---|---|
| Sarbanes-Oxley (SOX) | The Sarbanes-Oxley Act (SOX) requires all publicly held companies to establish internal controls and procedures for financial reporting to reduce the possibility of corporate fraud | $5M minimum |
| Gramm-Leach-Bliley Act (GLBA) | GLBA requires companies acting as "financial institutions" — i.e., companies that offer consumers financial products or services like loans, financial or investment advice, or insurance — to explain their information-sharing practices to their customers and to safeguard sensitive data | 1% of assets |
| Health Insurance Portability and Accountability Act (HIPAA) | Regulations protecting the privacy and security of certain health information | $50K - $250K per violation |
| Payment Card Industry Data Security Standard (PCI-DSS) | A set of security standards designed to ensure that ALL companies that accept, process, store or transmit credit card information maintain a secure environment | Up to $100K per month until compliance is achieved |
| EU General Data Protection Regulation (GDPR) | Requires businesses to protect the personal data and privacy of EU citizens for transactions that occur within EU member states and regulates the exportation of personal data outside the EU | Up to EUR 20M or 4% of world wide revenue whichever is greater |

| Loss Cause | Example | Protections | Damages Estimate |
|---|---|---|---|
| Physical | Damage to media | Backup | Equipment costs, Potential loss of revenue |
| Business data theft due to an external or an internal attack | Corporate customer information theft | UEBA, DLP, access control, etc. | Loss of revenue: ln(# of lost records)* average revenue per customer |
| Customer personal data theft due to an external attack | Data breach: PII, PHI, PCI data is exfiltrated | Technical measures (encryption, tokenization, patching) and data breach insurance | Regulatory penalties, litigation costs, incident cleanup costs (e.g. identity theft tracking, notification) |

| | SOX | GLBA | HIPAA | PCI-DSS | GDPR | ... |
|---|---|---|---|---|---|---|
| Data Store 001 | # of records subject to SOX regulation | # of records subject to GLBA regulation | # of records subject to HIPPA regulation | # of records subject to PCI regulation | # of records subject to GDPR regulation | |
| Data Store 002 | | | | | | |
| ⋮ | | | | | | |
| Data Store N | # of records subject to SOX regulation | # of records subject to GLBA regulation | # of records subject to HIPPA regulation | # of records subject to PCI regulation | # of records subject to GDPR regulation | |

|  | SOX | GLBA | HIPAA | PCI-DSS | GDPR | ... |
|---|---|---|---|---|---|---|
| Data Store 001 | 12 | 0 | 0 | 4 | 23 | |
| Data Store 002 | : | : | : | : | : | |
| : | | | | | | |
| Data Store N | exposure to SOX regulation | exposure to GLBA regulation | exposure to HIPPA regulation | exposure to PCI regulation | Exposure to GDPR regulation | |

| Company | Annual revenue | Revenue per customer | Assets | Number of data stores |
|---|---|---|---|---|
| Creative Enterprises, Inc. | $5B | $10,000 | $500M | 100 |

1400

| | Number of exposed records | Ponemon model | RAND Corp model |
|---|---|---|---|
| Potential liability | ~310,000 | $218,900,000 | $20,000,000 |

1401

| | No protection | Rank 1 | Rank 2 | Rank 3 | Rank 4 | Rank 5 |
|---|---|---|---|---|---|---|
| Protected data share | 0 | 0.37 | 0.66 | 0.87 | 0.95 | 1.0 |
| # of protected stores | 0 | 22 | 45 | 71 | 90 | 100 |
| KMS cost | N/A | $80,000 | $160,000 | $160,000 | $240,000 | $240,000 |
| Operating Exp. | N/A | $31,250 | $31,250 | $31,250 | $62,500 | $62,500 |
| Software licenses | N/A | $66,000 | $135,000 | $213,000 | $270,000 | $300,000 |
| Revenue loss | $131,000 | $131,000 | $131,000 | $131,000 | $131,000 | $131,000 |
| Insurance premium/Payout | N/A | $5,077,000 / $12,267,000 | $1,377,000 / $7,222,000 | $186,800 / $2,800,000 | $29,600 / $1,065,000 | $19,500 / $131,000 |
| Data breach protection cost | $20,130,000 | $5,385,000 | $1,830,000 | $722,000 | $733,000 | $753,000 |

METHOD, APPARATUS, AND COMPUTER-READABLE MEDIUM FOR DATA BREACH SIMULATION AND IMPACT ANALYSIS IN A COMPUTER NETWORK

BACKGROUND

The problem of data breaches is pervasive and is a highly publicized topic. Famous data breaches include massive customer data losses at Home Depot, Target, Neiman Marcus and Equifax. Most data breaches happen due to poor security posture, employee negligence or software defects. In general, there's no complete guarantee of preventing a data breach due to previously unknown defects in the deployed software products. Constant danger of a potential data breach and its monetary, legal, and business consequences is a driving force behind data protection efforts carried out by the businesses which makes estimation of data protection costs an extremely important task.

In a 2014 study of 700 consumers about brand reputation by Experian and the Ponemon Institute, data breaches were reported as the most damaging occurrence to brand reputation, exceeding environmental disasters and poor customer service. With the ever-growing volume of cyber-attacks on organizations, security analysts require effective visual interfaces and interaction techniques to detect security breaches and, equally importantly, to efficiently share threat information.

In particular, security analysts' at large organizations require effective systems, interfaces, and techniques for conducting data security intelligence, which is a key area at the intersection of big data and cybersecurity analytics. Identification of data protection scenarios is currently a manual process of applying a number of "what-if" scenarios to the enterprise data which is a time and labor-intensive process, does not guarantee an optimal result, and is error prone.

To support large organizations who manage thousands to tens of thousands of databases, Hadoop, and cloud applications in their environment, security intelligence applications, such as Informatica's Secure@Source, allow information security teams to discover sensitive data across all disparate data stores, define hierarchies, and provide logical organization (e.g., classification policies, data store groups, departments, locations, etc.) for measuring the risk associated with the sensitive data discovered.

However, given the large amount of data in distributed databases and the variety of data and policies that govern each data store, data security analysts face the technical challenge of not being able to measure or quantify what sensitive data is most in need of security protection, what sensitive data poses the greatest risks and liabilities in terms of overall impact, financial impact, and reputational impact in the event of a data breach, and what level of protection and what schemes would be most effective in improving enterprise security and reducing the overall impact of a data breach. For example, data stored in a first store of a network database may have completely different data fields, data attributes, and governing regulations than a second store in the network database. This problem grows exponentially in network databases with hundreds or thousands of data stores and data types.

Consequently, improvements are needed in systems for data breach simulation and impact analysis in distributed network databases.

BRIEF DESCRIPTION OF THE DRAWINGS

FIG. 3A illustrates a table listing examples of regulations that can be tracked according to an exemplary embodiment.

FIG. 3B illustrates a table showing common causes of data loss, such as physical loss, business data theft, and customer personal data theft due to an attack according to an exemplary embodiment.

FIG. 5 illustrates an example of a data exposure matrix according to an exemplary embodiment.

FIG. 6 illustrates another example of the data exposure matrix according to an exemplary embodiment.

FIG. 14 illustrates an example of the optimal data breach and mitigation scenario determination comparison in a tabular format according to an exemplary embodiment.

DETAILED DESCRIPTION

Figure 1:
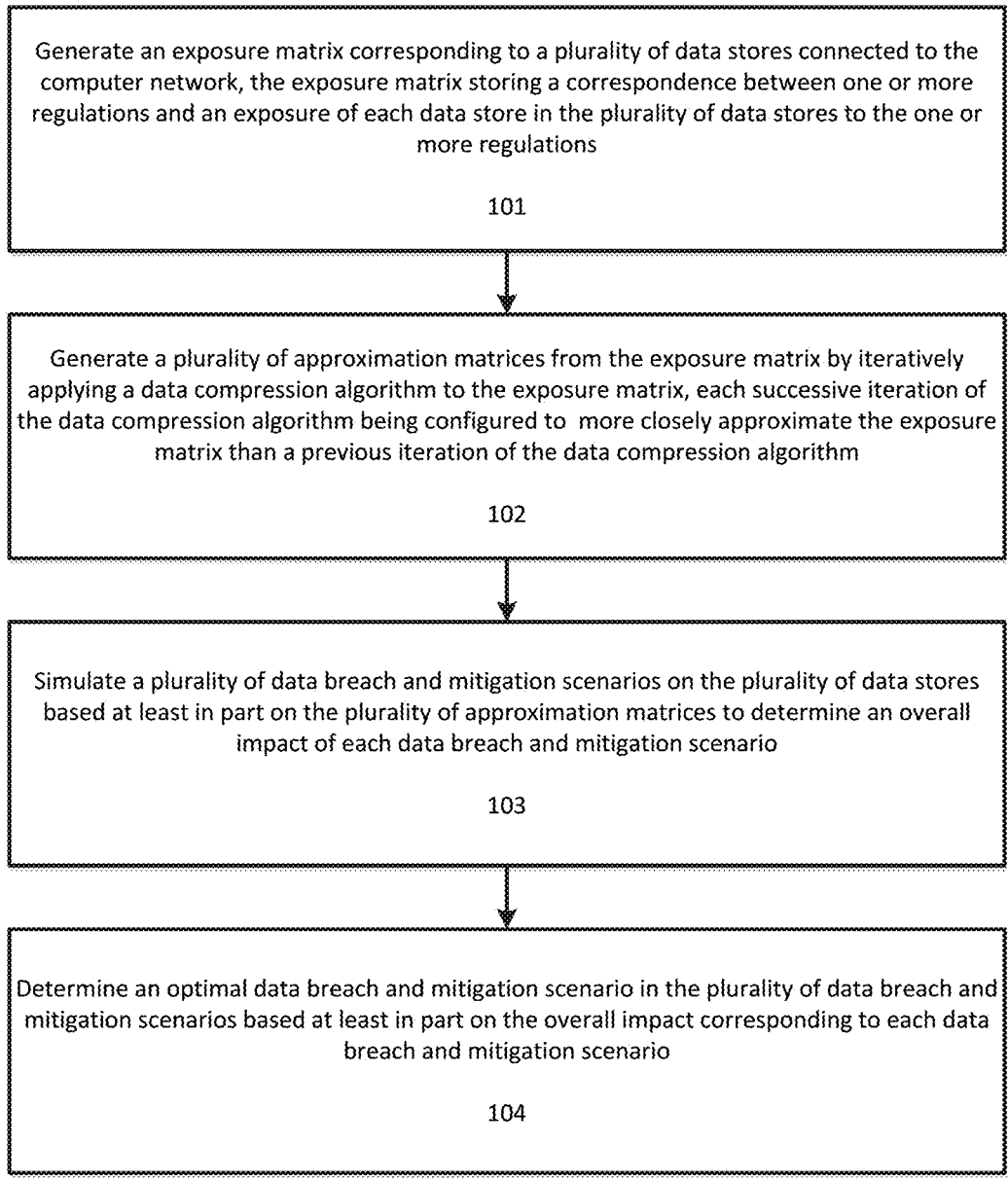
FIG. 1 illustrates a flowchart for data breach simulation and analysis in a computer network according to an exemplary embodiment.

While methods, apparatuses, and computer-readable media are described herein by way of examples and embodiments, those skilled in the art recognize that methods, apparatuses, and computer-readable media for data protection optimization in a computer network are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

As discussed above, improvements are needed in systems for data security intelligence assessment in distributed databases in order to provide data security analysts with the tools required to not only determine sources of vulnerabilities in a distributed database, but also to determine the overall impact of a data breach on distributed data stores in a computer network and to determine protection schemes that maximize protection of data at an enterprise level while minimizing negative impact.

Due to limited resources, both in terms of computational resources (such as processing power, storage space, data characteristics and limitations, available protection mechanisms, etc.) and enterprise resources (such as qualified personnel, budget, location, space, etc.), it is necessary for enterprises to prioritize protections applied to data in a distributed database to achieve maximum impact on enterprise security at minimal costs (both computationally and organizationally).

Given the limited resources (both computational and organizational) available for addressing security vulnerabilities, it is critical that security analysts be able to accurately simulate a data breach, model the impact of the data breach among the various data stores in the network, and also model protection schemes and the impact of those protection schemes on the organization. This simulation and modeling enables the enterprise to not only identify what types of data breaches will have an outsized impact on the organization, but also to identify protections that will minimize the impact of a data breach and the resources required to implement to those protections.

Applicant has discovered a method, apparatus, and computer-readable medium that solves the existing problems in the data security intelligence field through the simulation and impact analysis of data breaches on the data stores of a computer network. The present application discloses a robust method for constructing and assessing multiple protection scenarios by simulating data breach events for discovering an optimal data protection scenario.

The disclosed method, apparatus, and computer-readable medium for data breach simulation and analysis in a computer network provides a powerful tool for enterprise chief information security officers (CISOs) or data security officers (DSOs) that enables realistic assessment of the overall impact of a data breach among the varied data stores in an enterprise network.

FIG. 1 illustrates a flowchart for data breach simulation and analysis in a computer network according to an exemplary embodiment. The computer network can be any type of wide area or local area network that includes distributed data stores or computing devices, such as an enterprise level network with servers, data stores, databases, connected computing devices (personal computers, mobile devices), network hardware, etc.

Figure 2:
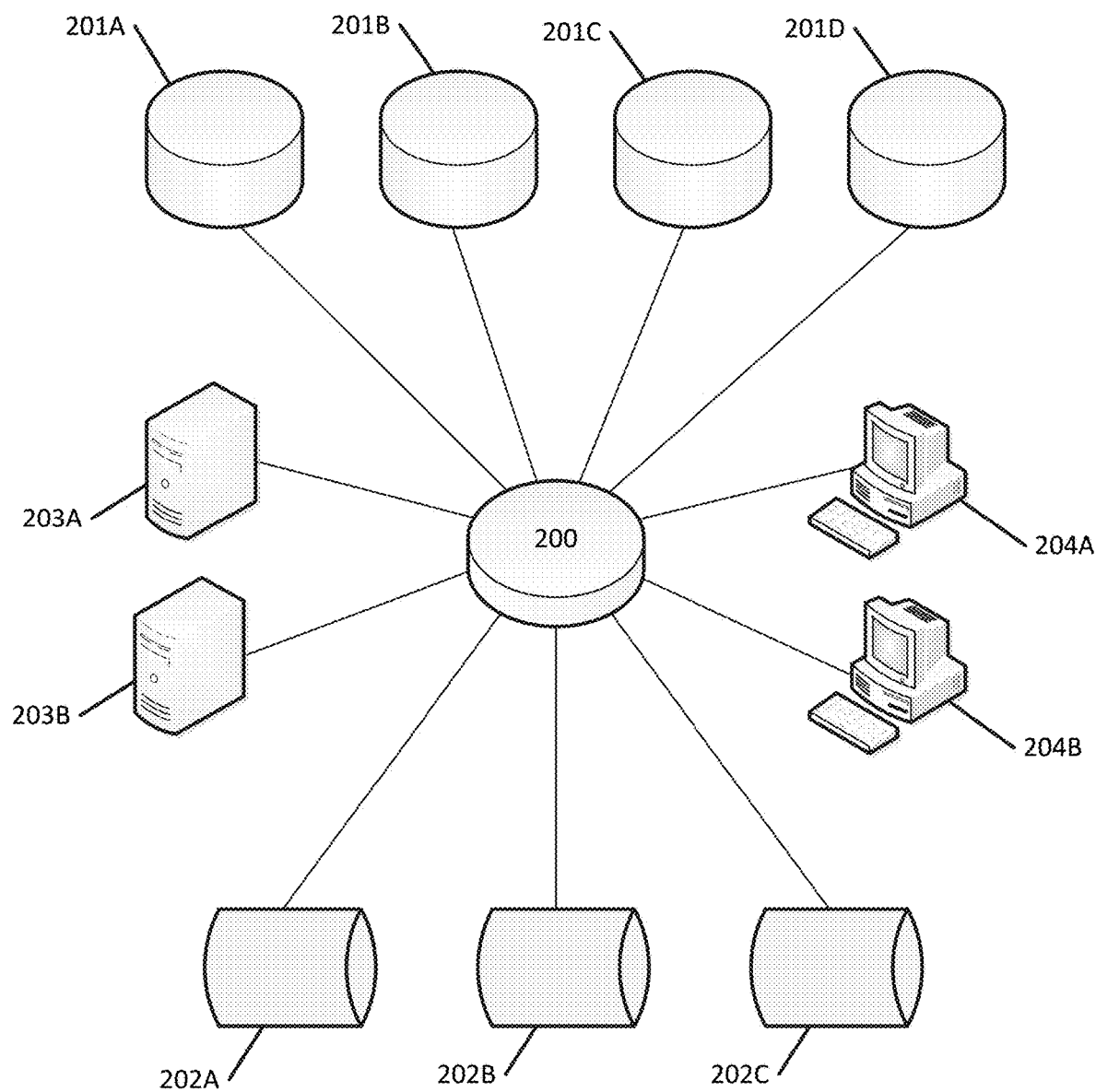
FIG. 2 illustrates a computer network according to an exemplary embodiment.

FIG. 2 illustrates a computer network 200 according to an exemplary embodiment. As shown in FIG. 2, the network 200 can include one or more data stores, such as data stores 201A-201D. The data stores can store any type of information in any structure. For example, the data stores can be relational databases storing records in tables having columns or row or can store data in an unstructured or semi-structured format, such as a NoSQL databases. Network 200 additionally include one or more servers, such as servers 203A-203B that are responsible for hosting services or content accessible to client devices, such as computing devices 204A-204B. The network 200 can further include one or more additional databases, such as 202A-202C that can store information separate from the data records stored on data stores 201A-201D. Additional databases 202A-202C can be, for example, metadata databases that store metadata regarding various data stores, security information, access control or authentication information, user profiles, risk assessment information, regulatory information, audit and compliance information, or any other type of information.

The steps shown in FIG. 1 can be performed by a computing device on the computer network (or one or more computing devices on the computer network that communicate with each other). For example, the steps shown in FIG. 1 can be executed by software running on one or more user or client computing devices, on one or more server computing devices, on one or more data stores or other databases, or on any combination of these devices.

At step 101 an exposure matrix corresponding to a plurality of data stores connected to the computer network is generated. The exposure matrix can store a correspondence between one or more regulations and an exposure of each data store in the plurality of data stores to the one or more regulations. Regulations, as used herein, can include any laws, legal requirements, compliance requirements, standards, or other rules which govern the handling, processing, storage, removal, or management of data.

FIG. 3A illustrates a table 300 listing examples of regulations that can be tracked according to an exemplary embodiment. Table 300 includes a listing of various regulations, along with descriptions of the regulation, and penalties associated with the regulation. As shown in the table 300, the regulations can include the Sarbanes-Oxley (SOX) Act, the Gramm-Leach-Bliley Act (GLBA), Health Insurance Portability and Accountability Act (HIPAA), Payment Card Industry Data Security Standard (PCI-DSS), and the General Data Protection Regulation (GDPR).

The SOX Act requires all publicly held companies to establish internal controls and procedures for financial reporting to reduce the possibility of corporate fraud. Non-compliance with SOX can be punished by a minimal fine of $5,000,000.

The GLBA requires companies acting as financial institutions—i.e., companies that offer consumers financial products or services like loans, financial or investment advice, or insurance—to explain their information-sharing practices to their customers and to safeguard customers' sensitive data. Non-compliance with GLBA can result in a penalty in the amount of 1% of the company assets.

HIPAA enforces regulations protecting the privacy and security of certain health information. A typical penalty for HIPAA violation is between $50,000 and $250,000 though in a known case a disclosure of a single medical record without a patient's consent incurred a penalty of $1,400,000.

PCI-DSS is an example of an industry regulation intended to protect both consumers and the credit card issuers and processors. PCI-DSS establishes a set of security standards designed to ensure that all companies that accept, process, store or transmit credit card information maintain a secure environment. A penalty for PCI-DSS violation is open ended: up to $100,000 penalty is imposed monthly until compliance is achieved.

General Data Protection Regulation (GDPR) enacted by European Union (EU) requires businesses to protect the personal data and privacy of EU citizens for transactions that occur within EU member states and regulates the exportation of personal data outside the EU. For a larger companies GDPR non-compliance may incur penalties of EUR 20,000,000 or 4% of the company's worldwide annual revenue whichever is greater.

The regulations shown in FIG. 3A are examples of regulations that can be utilized for the exposure matrix and are not intended to be limiting. The exposure matrix can store a correspondence between each data store and any regulation governing use, processing, sharing, management, handling, or removal of data.

Of course, the penalties associated with each regulation apply only in the event of data loss or data breach. Data loss can have a variety of causes. FIG. 3B illustrates a table 301 showing common causes of data loss, such as physical loss, business data theft, and customer personal data theft due to an attack. Table 301 also illustrates examples of each type of cause, protections that are available to safeguard against that type of cause, and possible damages resulting from the loss due to that cause.

Data loss due to physical causes can be based upon defective hardware or improperly stored backup copies of the enterprise data. Protections against physical loss include backup equipment, such as redundant hardware and storage devices. Modern storage devices often have built in encryption at physical level—a feature which mitigates data breaches due to device theft. These protections are typically built into the cost of an Information Technology (IT) infrastructure and are known up front.

Damages resulting from physical loss can include equipment costs to replace the physical hardware and (if protections such as redundancy are not in place) revenue loss from the loss of business data or costs pertaining to recovering lost data. If physical hardware is lost, then damages can also include cleanup costs and potential damages associated with regulations governing the data that was stored on the lost device.

Also shown in table 301 is business data theft due to an external or internal attack. The cost of business data theft depends on the type of loss. Theft of intellectual property (IP) may result in a loss of competitive edge in the company's market. Losses of this kind, if detected, are recovered by the means of litigation. Customer corporate data theft typically results in a loss of a few customers who were offered a better deal by an unscrupulous competitor. Unless the competitor offers a far superior product at a better price the core customers do not leave an earlier established vendor. Loss of revenue due to this kind of data breach can be estimated using the following formula:

$$S_{lost} = \ln(R_{lost}) * \overline{S_{cust}}$$

Where $S_{lost}$ is loss of revenue due to a business data loss, $R_{lost}$ is the number of compromised customer accounts and $\overline{S_{cust}}$ is the average revenue per customer.

Of course, other techniques and formulas can be used to estimate loss of revenue due to customer desertion. For example, a certain fixed share of customers can be used as an estimate of lost customers.

Protections against business data theft include deployment of a variety of security software measures which include data leakage prevention (DLP) tool, user behavior monitoring systems, access to data control enforcement, etc. The costs of business data prevention measures are also a recurring part of the IT organization budget and are typically known upfront.

Further referring to FIG. 3B, while enterprise business data loss is a serious adverse event, typically, it does not carry bad publicity or a damaging legal action. This is not the case with a loss of private customer data which reflects negatively on the breached enterprise image and may carry significant monetary losses due to adversarial legal action and penalties imposed by various government and business organizations. As discussed with respect to FIG. 3A, there are many government legislations and industry regulations which establish penalties for improper financial disclosures, leaks of personally identifiable data, personal health information, etc. Besides regulatory penalties, litigation and incident cleanup costs (e.g. notification and identity theft tracking) are also incurred.

Protections against personal data risk theft include technical measures, such as data encryption, data masking, data tokenization, continuous software patching processes, and access controls, as well enterprise policies such as data breach insurance coverage.

The present system allows for the determination of an effect of data protection mechanisms on data stores in a distributed network database without actually requiring implementation of those data protection mechanism. In particular, the novel systems and methods disclosed herein extract data from data stores or data fields in a distributed network and apply transformations to the extracted data that simulate the application of protection mechanisms. The simulated values of the extracted data are then analyzed to assess the security impact of particular protection mechanisms on the relevant data. This approach allows not only for a deterministic solution to the problem of what data to protect, but also to the problem of how best to protect the data.

FIG. 2 illustrates a flowchart for data protection optimization in a computer network according to an exemplary embodiment. At step 201 data corresponding to a plurality of data stores in the computer network is grouped into a plurality of groupings according to one or more of at least one architectural attribute of the data or at least one conceptual attribute of the data, with each grouping corresponding to one or more data stores and one or more domains.

A data store is a database, memory, or other physical storage medium that stores data and includes, at a minimum, a set of fields (for a structured database such as a relational database) or files (for an unstructured database such as a NoSQL database). While the description and figures in this specification refer to "fields," it is understood that in an unstructured database, the disclosed operations can be performed on "files." Data can include the actual data present in the memory of a particular store or events (user activity, user activity anomalies) occurring over the data in a particular store and corresponding to the data store. For example, data corresponding to a data store can include user access information for that data store.

Returning to step 101 of FIG. 1, the generation of an exposure matrix requires that the device generating the exposure matrix either have access to the data stores (over the network) or have access to metadata collected from the data stores (through some intermediary). This step also requires access to information regarding regulations and the types of data covered by each regulation. For example, HIPPA applies only to health related information. In this case, the relevant metadata for each store can indicate whether the data store includes health related domains or fields and the percentage of records that include health related domains or fields.

Figure 4:
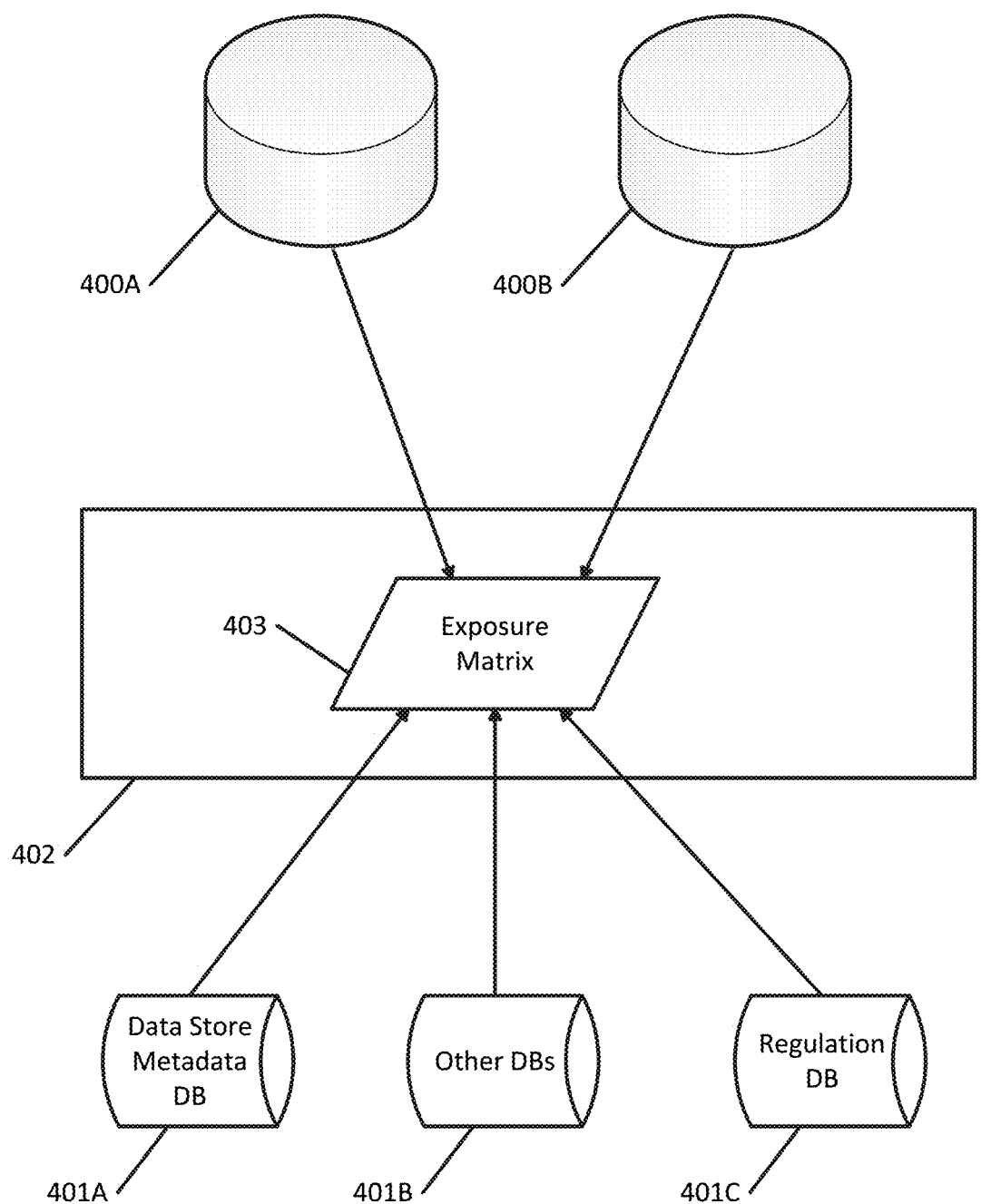
FIG. 4 illustrates an example of the information sources that can be utilized to build the exposure matrix according to an exemplary embodiment.

FIG. 4 illustrates an example of the information sources that can be utilized to build the exposure matrix. As shown in FIG. 4, the exposure matrix 403 on network computing device 402 can be built using information gathered from other devices on the network, such as data stores 400A-400B and/or one or more other databases, such as a data store metadata database 401A, a regulations database 401C, or other databases 401B. The other databases can include security information and/or risk analysis databases. For example, security profiling databases can track information regarding locations of sensitive data records, types of sensitive data records, security controls, users, etc.

The data exposure matrix itself can take a number of different forms. FIG. 5 illustrates an example of a data exposure matrix according to an exemplary embodiment. The data exposure matrix 500 stores a number of records in each data store that are subject to each of at least five different regulations (the previously discussed SOX, GLBA, HIPAA, PCI-DSS, and GDPR). The rows of the data exposure matrix 500 represent data stores, the columns of the data exposure matrix 500 represent regulations to which data kept in the enterprise data stores is subject, and the cells of the data exposure matrix 500 indicate the number of data records in a respective data store subject to a respective regulation.

The cell quantities in matrix 500 can be populated by mining, analyzing, and/or profiling each of the data stores. This process can be performed as part of the process of generating the exposure matrix (for example, by analyzing data store metadata regarding fields or domains in a store and number of records in each field or domain and filtering the metadata based upon the data fields or domains pertinent to each regulation) or can be performed by a security or risk assessment process that is already part of the enterprise security system and which is queried as part of the exposure matrix generation process.

The data exposure matrix can also take into account the potential impact of each of the regulations on the individual data stores in the event of a leak. For example, using the penalty information corresponding to a particular regulation, the exposure of a data store i to legislation or regulation j can be determined by the formula:

$$\epsilon_{ij} = \frac{r_{ij}}{\sum_i r_{ij}} p_{max\ j}$$

Where $\epsilon_{ij}$ is the data store i exposure to legislation or regulation j, is the number of records in data store i subject to legislation or regulation j, and $\Sigma_i r_{ij}$ is the total number of records in data store i, and $p_{max\ j}$ is the maximum penalty imposed by legislation or regulation j. While maximum penalty is useful for estimating worst case scenarios, it is understood that other penalty amounts can be utilized as well, such as average penalty or median penalty.

FIG. 6 illustrates another example of the data exposure matrix according to an exemplary embodiment. In data exposure matrix 600, the above-mentioned exposure formula can be used to generate a numerical quantity indicating, for example, the total exposure in hundreds of thousands of dollars. So, for example, the exposure of Data Store 001 to the GDPR is $2.3 million dollars. Known data loss/exposure cost estimates use the Ponemon Institute model which statistically estimates average cost of a data record loss per locality. For 2017 Ponemon Institute estimated the cost of a single record in a US company at $141. Both the data exposure matrices shown in FIG. 5 and FIG. 6 store a correspondence between one or more regulations and an exposure of each data store in the plurality of data stores to the one or more regulations. Other data exposure matrices can also be utilized and these examples are not intended to be limiting.

Various regulations may cover the same type of information. For example, HIPAA and GDPR cover Personal Identifying Information (PII) such as person's name, last name, SSN, etc. To avoid "double booking" the information that is unique to each of the regulations and that is subject to each of the regulations can be determined. Exposure to a first regulation can then be computed based upon its unique data, exposure to a second regulation can be computed based upon its unique data, and exposure of information common to both regulations can be computed using a "maximum cost" regulation. The corresponding record counts (or cost values) in the exposure matrix can be revised according to results of the above computation. The same computation is applicable to when data in a data store is subject to more than two regulations.

Returning to FIG. 1, at step 102 a plurality of approximation matrices is generated from the exposure matrix by iteratively applying a data compression algorithm to the exposure matrix, each successive iteration of the data compression algorithm being configured to more closely approximate the exposure matrix than a previous iteration of the data compression algorithm.

Figure 7:
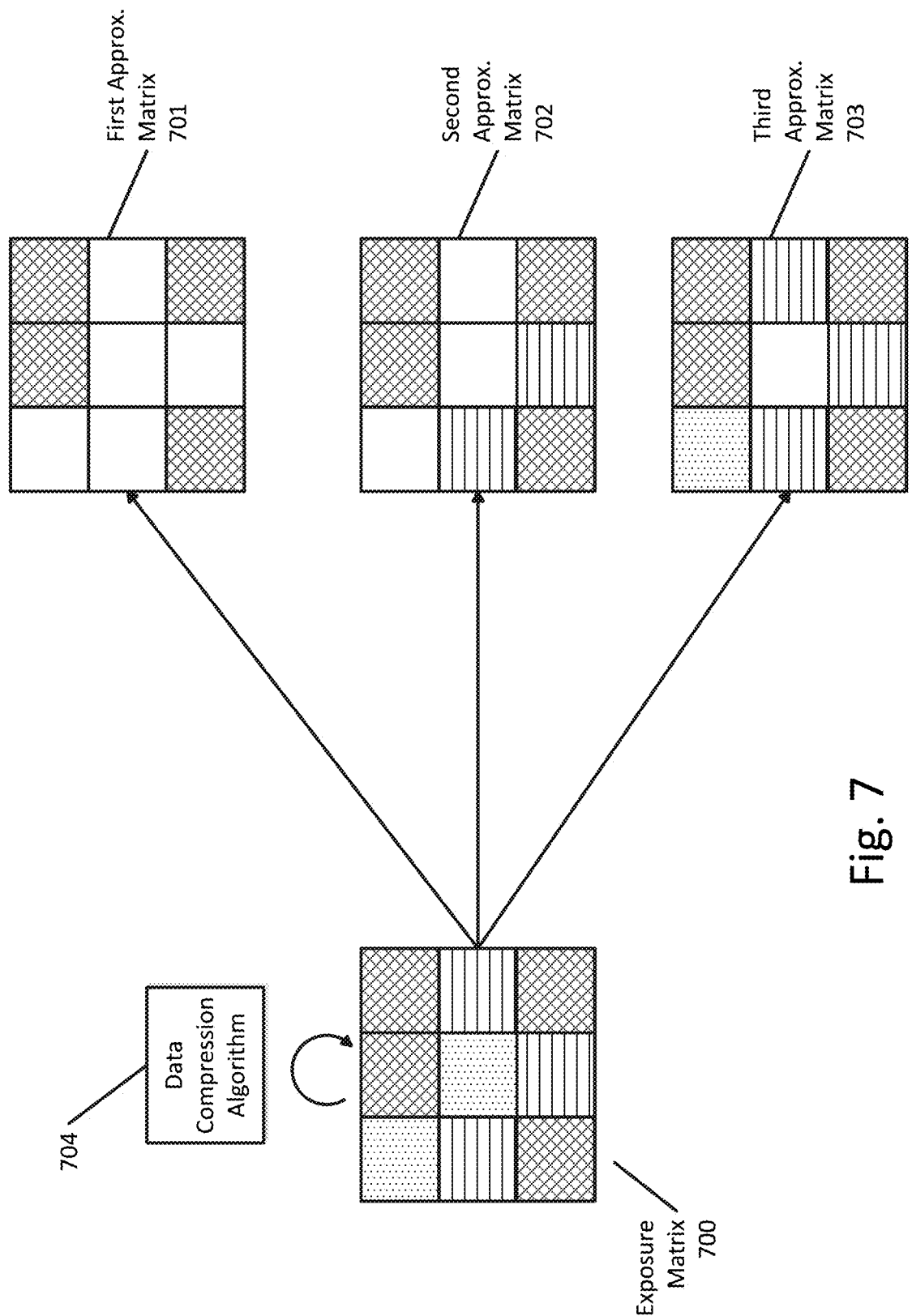
FIG. 7 illustrates an example of iteratively applying a data compression algorithm to an exposure matrix to generate a plurality of approximation matrices according to an exemplary embodiment.

FIG. 7 illustrates an example of iteratively applying a data compression algorithm to an exposure matrix to generate a plurality of approximation matrices. As shown in FIG. 7, three iterations of the data compression algorithm 704 to the exposure matrix 700 results in the first approximation matrix 701, the second approximation matrix 702, and the third approximation matrix 703. As shown, each successive approximation matrix more closely approximates the values in the exposure matrix. For example, third approximation matrix 703 is 88.88% (8/9) similar to the exposure matrix 700 whereas the first approximation matrix 701 is only 44.44% (4/9) similar to the exposure matrix.

As discussed below, the compression algorithm can be selected and applied such that the resulting approximation matrices first preserve the most impactful aspects of the exposure matrix in earlier iterations, thereby de-emphasizing less impactful aspects of the exposure matrix until later iterations.

Each iterative application of the data compression algorithm can utilize slightly different parameters in order to generate approximation matrices with varying degrees of approximation to the original exposure matrix. Iterative application of the data compression algorithm does not require that the data compression algorithm be applied to the result of an earlier application (i.e., to an earlier approximation matrix), but only that the data compression algorithm is applied repeatedly to the exposure matrix in a way that produces distinct resulting approximation matrices.

Iterative application of the data compression algorithm can also result in generation of approximation matrices that successively less closely approximate the exposure matrix. In this case, the first approximation matrix would be the closest to the exposure matrix and each subsequent approximation matrix would less closely approximate the exposure matrix.

One example of a data compression algorithm that can be iteratively applied to the data exposure matrix to generate approximation matrices is the Singular Value Decomposition (SVD) method. The SVD method allows representing any matrix as a combination of three special matrices:

$$E=U\Sigma V^T$$

Where E is a m×n matrix being decomposed;
U is an m×m unitary matrix;
Σ is a diagonal m×n matrix comprised of the matrix E singular values sorted in descending order; and
V is a n×n unitary matrix The iterative generation of approximation matrices using SVD exploits the compression property of the computed singular values for identifying data elements in the data exposure matrix which characterize exposure of the enterprise data the most. This property is achieved by constructing approximations $E_s$ of the original matrix E where the diagonal matrix $\Sigma_s$ retains s largest singular values of said matrix E, s=1, . . . , r, where r is the number of non-zero singular values of said matrix E:

$$U\Sigma_s V^T=E_s$$

For each successive approximation $E_s$ the remaining m−s diagonal elements are replaced by zeros. The number of retained singular values, s, represents approximation rank of the original matrix E.

Figure 8:
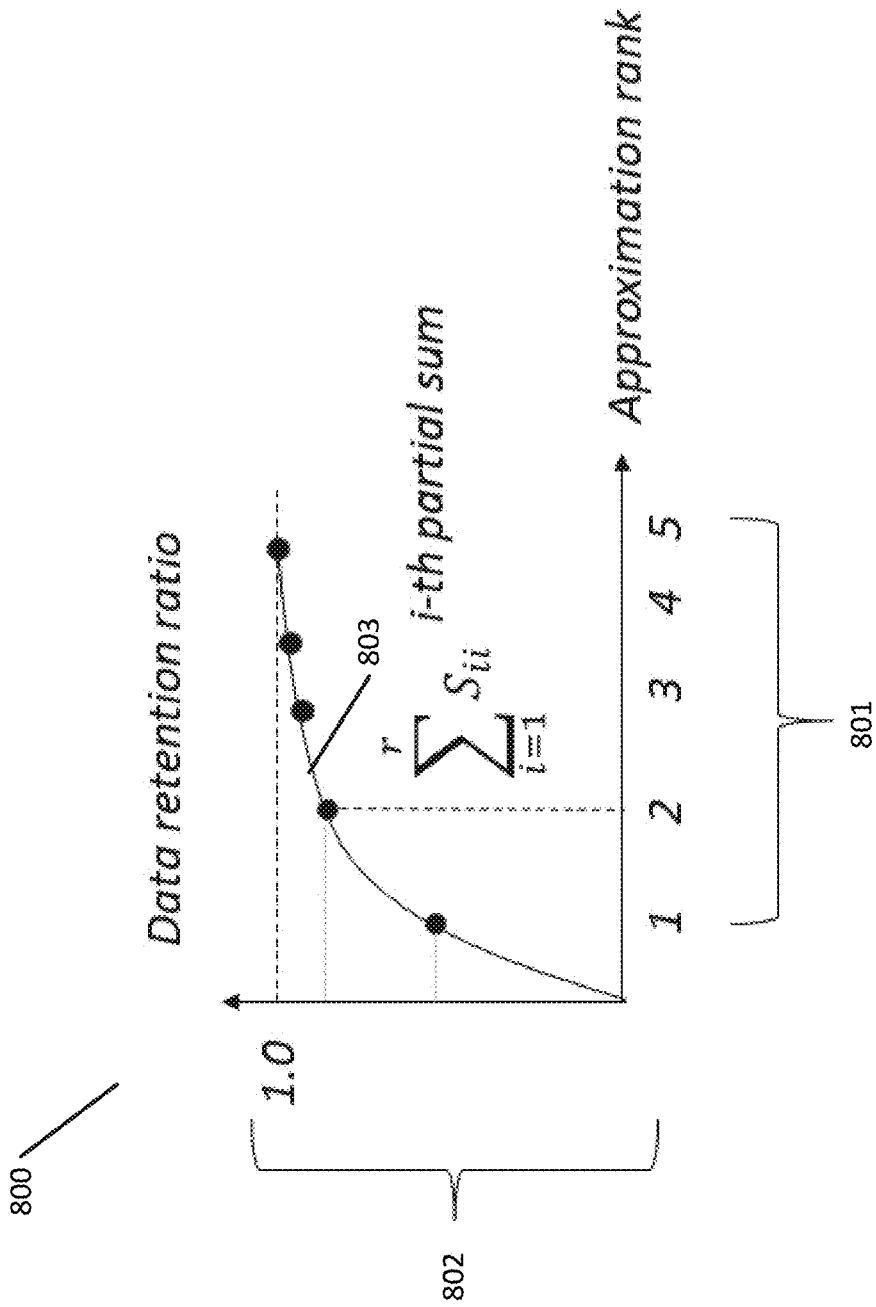
FIG. 8 illustrates a graph showing a relationship between data retention rate and the approximation rank when iteratively generating approximation matrices using singular value decomposition according to an exemplary embodiment.

FIG. 8 illustrates a graph 800 showing a relationship between data retention rate 802 and the approximation rank 801 when iteratively generating approximation matrices using SVD according to an exemplary embodiment. As shown in FIG. 8, the original matrix decomposition produced five non-zero singular values 801 marked by the numbers 1 through 5 with 1 being the largest singular value. The i-th partial sum 803 of first i singular values estimates data retention ratio corresponding to the i-th successive approximation E.

Of course, SVD is provided as an example of the data compression algorithm that can be utilized, and it is appreciated that other data compression, matrix approximation, and sampling algorithms can be utilized to generate the approximation matrices. For example, the approximation matrices can be generated using the alternating projections algorithm, structured low-rank approximation, Batson-Spielman-Srivastava (BSS) sampling, or the CUR algorithm.

Returning to FIG. 1, at step 103 a plurality of data breach and mitigation scenarios on the plurality of data stores are simulated based at least in part on the plurality of approximation matrices to determine an overall impact of each data breach and mitigation scenario.

Figure 9:
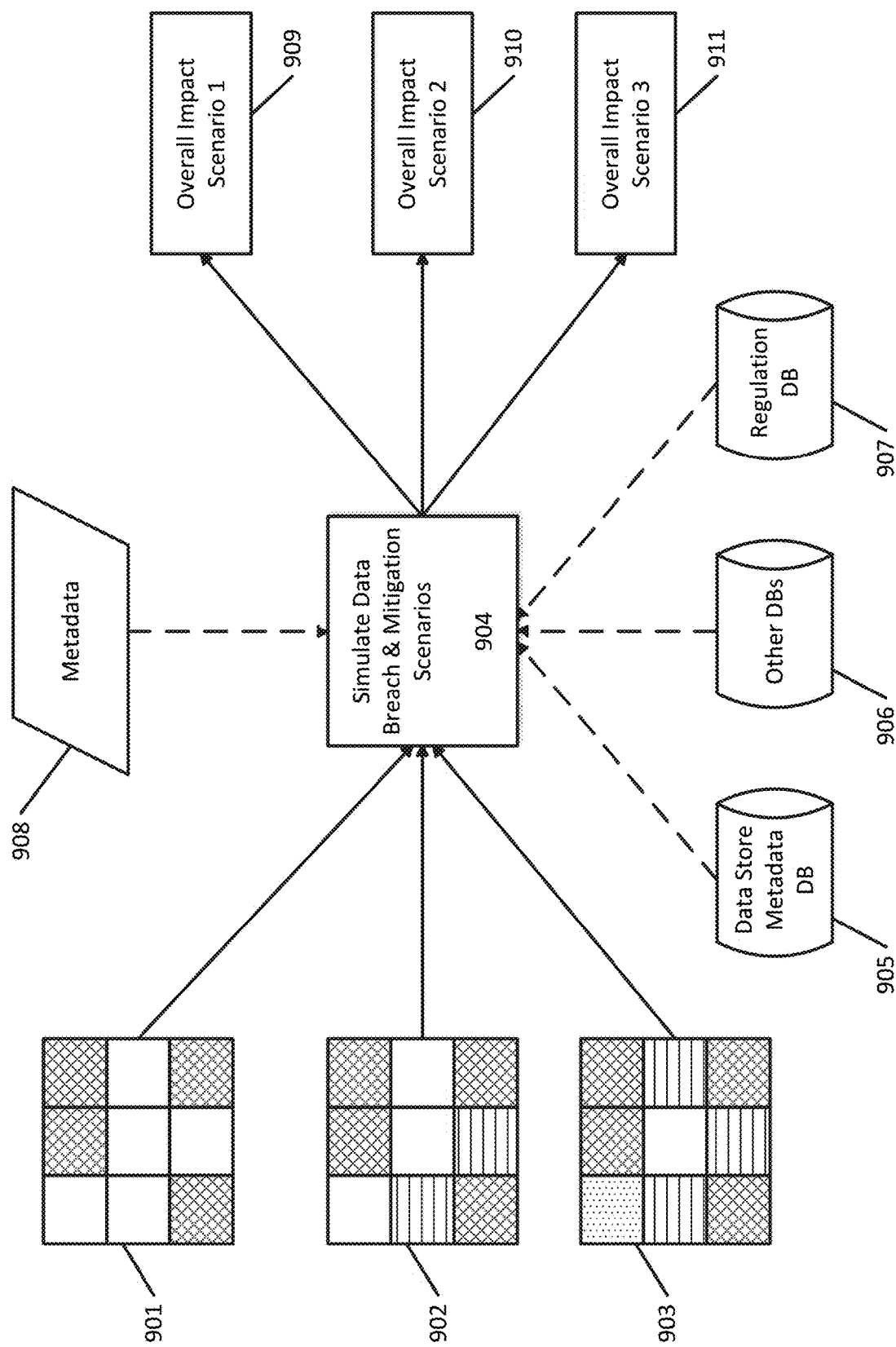
FIG. 9 illustrates a process flow diagram for simulating a plurality of data breach and mitigation scenarios on the plurality of data stores according to an exemplary embodiment.

FIG. 9 illustrates a process flow diagram for simulating a plurality of data breach and mitigation scenarios on the plurality of data stores according to an exemplary embodiment. As shown in FIG. 9 each of three approximation matrices 901, 902, and 903 is used to simulate three data breach and mitigation scenarios at block 904, and those three simulated scenarios are then utilized to determine an overall impact of each scenario, indicated by blocks 909, 910, and 911.

The simulation of the data breach and mitigation scenarios can utilize additional information in the form of metadata 908. Metadata can include any information required to accurately assess impact (such as data models, losses, financial losses, loss of business, loss of traffic, loss of productivity, loss of reputation, loss of resources, damages, fines, etc.), protection measures (e.g., protection mechanisms utilized such as an encryption, masking, access control, etc.), protection costs (e.g., resources, human resources, computational resources, or costs associated with protection measures etc.), mitigation measures and costs, or any other pertinent information required to simulate a data breach of stores identified in each approximation matrix, simulate the impact of the data breach, and simulate the mitigation measures required for each data breach.

The simulation of the data breach and mitigation scenarios can utilize information from a data store metadata database 905, a regulations database 907, and one or more other databases 906, as discussed earlier. For example, the data store metadata database 905 can include information about protection mechanism available on particular data stores. This information can be used in conjunction with metadata 908 regarding costs (both in computational resources or otherwise) to implement certain protections to simulate how portions of a particular data store would be protected for the simulated data breach and mitigation scenario.

Figure 10:
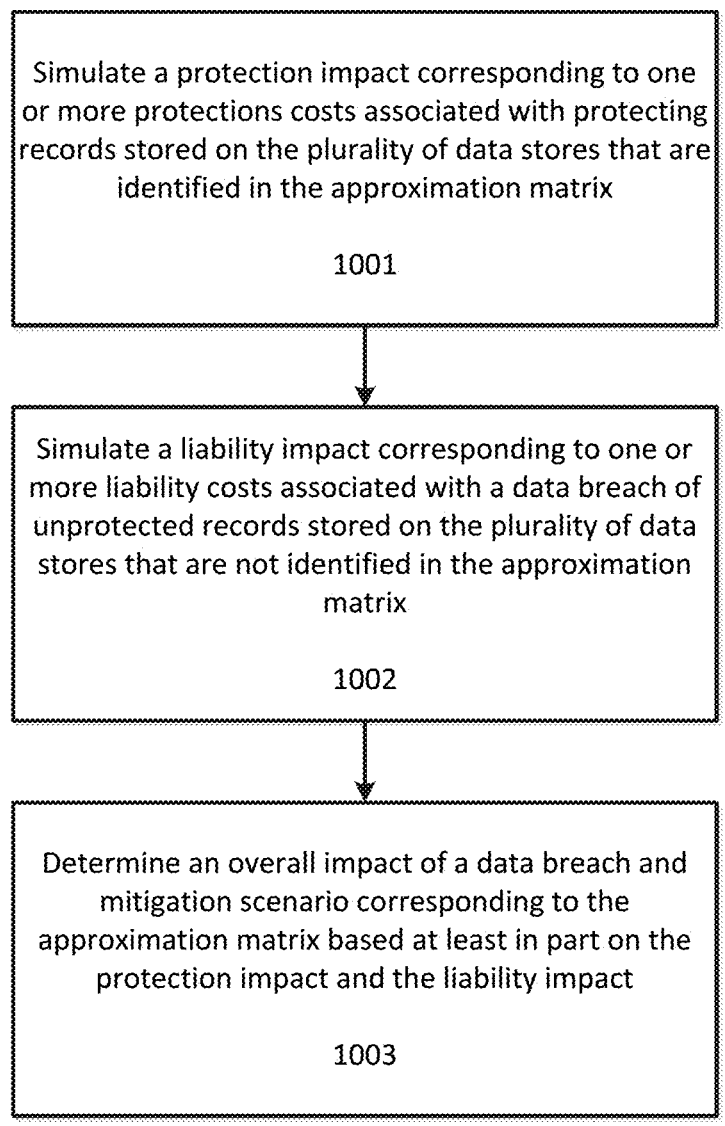
FIG. 10 illustrates a flowchart for simulating a plurality of data breach and mitigation scenarios on the plurality of data stores based at least in part on the plurality of approximation matrices to determine an overall impact of each data breach and mitigation scenario according to an exemplary embodiment.

FIG. 10 illustrates a flowchart for simulating a plurality of data breach and mitigation scenarios on the plurality of data stores based at least in part on the plurality of approximation matrices to determine an overall impact of each data breach and mitigation scenario according to an exemplary embodiment.

At step 1001 a protection impact corresponding to one or more protections costs is associated with protecting records stored on the plurality of data stores that are identified in the approximation matrix is simulated. Simulating a protection impact can include determining, for example, a hardware expense associated with protecting records identified in the approximation matrix, a software expense associated with protecting records identified in the approximation matrix, and/or an operational expense associated with protecting records identified in the approximation matrix.

Simulating the protection impact can include estimating the cost of hardware and software which provides data protection, the computational resources required to implement protections, the costs and personnel required to service data protection solutions such as cryptographic key management systems, authentication and authorization facilities and other data security components. Simulating the protection impact can also include, without limitation, estimating the cost of specialized protective facilities in the data centers, estimating related personnel training expenses, estimating additional IT expenses, etc.

At step 1002 a liability impact corresponding to one or more liability costs associated with a data breach of unprotected records stored on the plurality of data stores that are not identified in the approximation matrix is simulated. Simulating a liability impact can include, for example, determining regulatory expenses associated with a breach of the unprotected records, an insurance premium corresponding to insurance coverage for the unprotected records, a coverage amount for insurance, and/or revenue loss due to customer desertion.

Data breach insurance and cyber liability insurance helps cover the costs of a data security breach for things like identity protection solutions, public relations, legal fees, liability and more depending on the coverage. Prior to underwriting a data breach insurance, the insurers assess the client's data security posture and quote premium amount based on their findings. The simulations described herein can be used to determine an insurance coverage amount required for counter balancing consequences of a data breach.

Simulated insurance premiums and coverage amounts can be determined using data models regarding the risk of breach and cost of a data breach, such as the Ponemon Institute model ("Ponemon model") and the RAND Corporation model ("RAND model") which differ in the cost calculation methodology. The Ponemon model statistically estimates average cost of a data record loss per locality. For 2017 Ponemon model estimates the cost of a single record loss by a US company at $141. The RAND model uses historical statistical information about the data breaches and estimates the cost of a data breach as 0.4% of the breached company annual revenue.

Ponemon Institute estimates probability of a data breach which incurs loss of up to 10,000 data records at 0.28 over a two-year period and probability of a data breach which incurs loss of more than 100,000 data records at 0.01 over a two-year period. Probability of a data breach event adheres to Poisson distribution which means that the probability of a subsequent data breach event is constant and does not decrease or increase with elapsed time.

Figure 11:
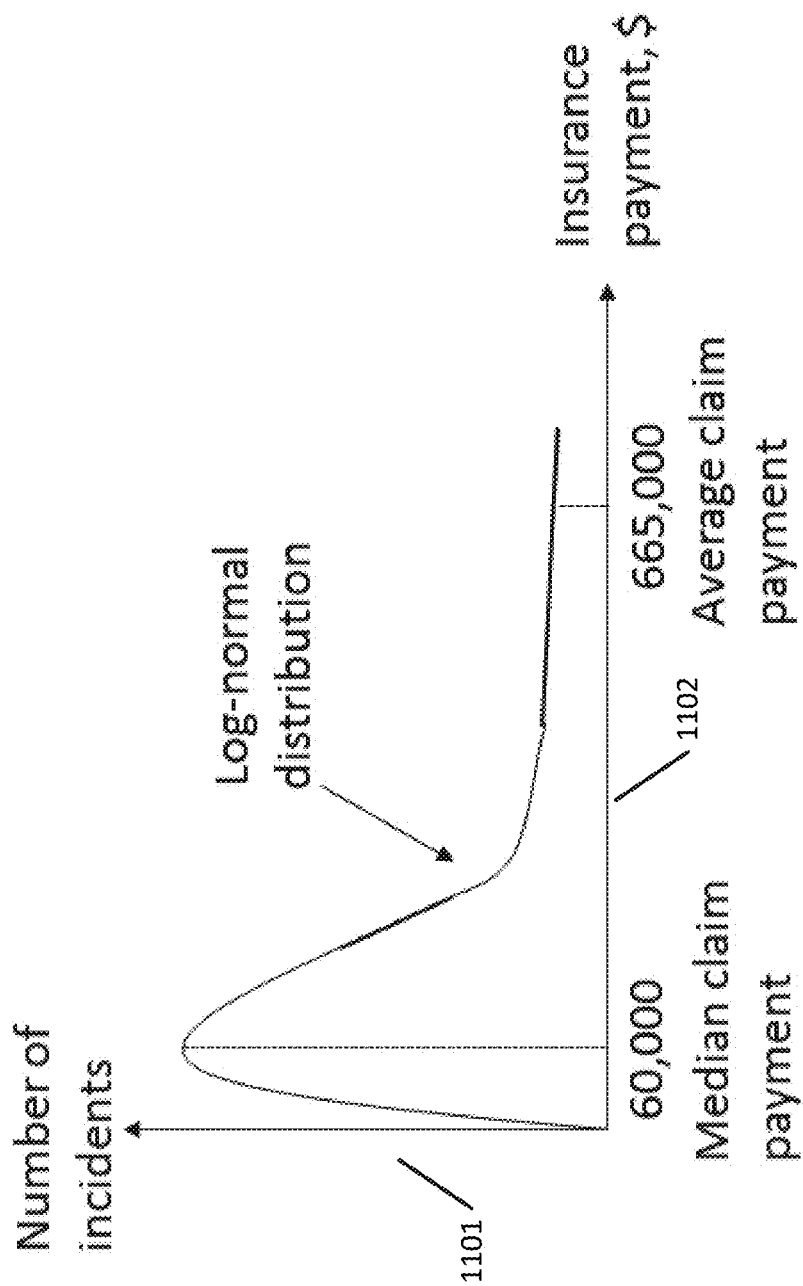
FIG. 11 illustrates breach insurance payouts according to an exemplary embodiment.

Taking into the account probabilities of a data breach events and their statistical characteristics, the chart 1100 in FIG. 11 illustrates Insurance payments 1102 distribution as a function of the Number of incidents 1101. According to the insurance industry statistics for the year of 2016 average claim payment in data breach incidents in the US amounted to $665,000 while a median claim payment was $60,000. The amount of insurance payouts in the 10-90 percentile has been between $5,800 and $1,600,000 with the maximum data breach insurance payout of $15,000,000. A total of cyber breach insurance claims amounted to $114,000,000. As shown in FIG. 11, based on the available statistical data, breach insurance payouts adhere to Log-Normal Distribution.

The simulated data breach insurance premium can be calculated from the above statistical information, Ponemon's probability of a data breach estimate, and by considering a standard insurance markup rate of 40%. Said calculation estimates annualized data breach insurance premium at $19,500 per $1,000,000 coverage. Importantly, said insurance premium is available to the insureds which demonstrated adequate data protection efforts such as data encryption, data tokenization or similar protective measures.

Figure 12:
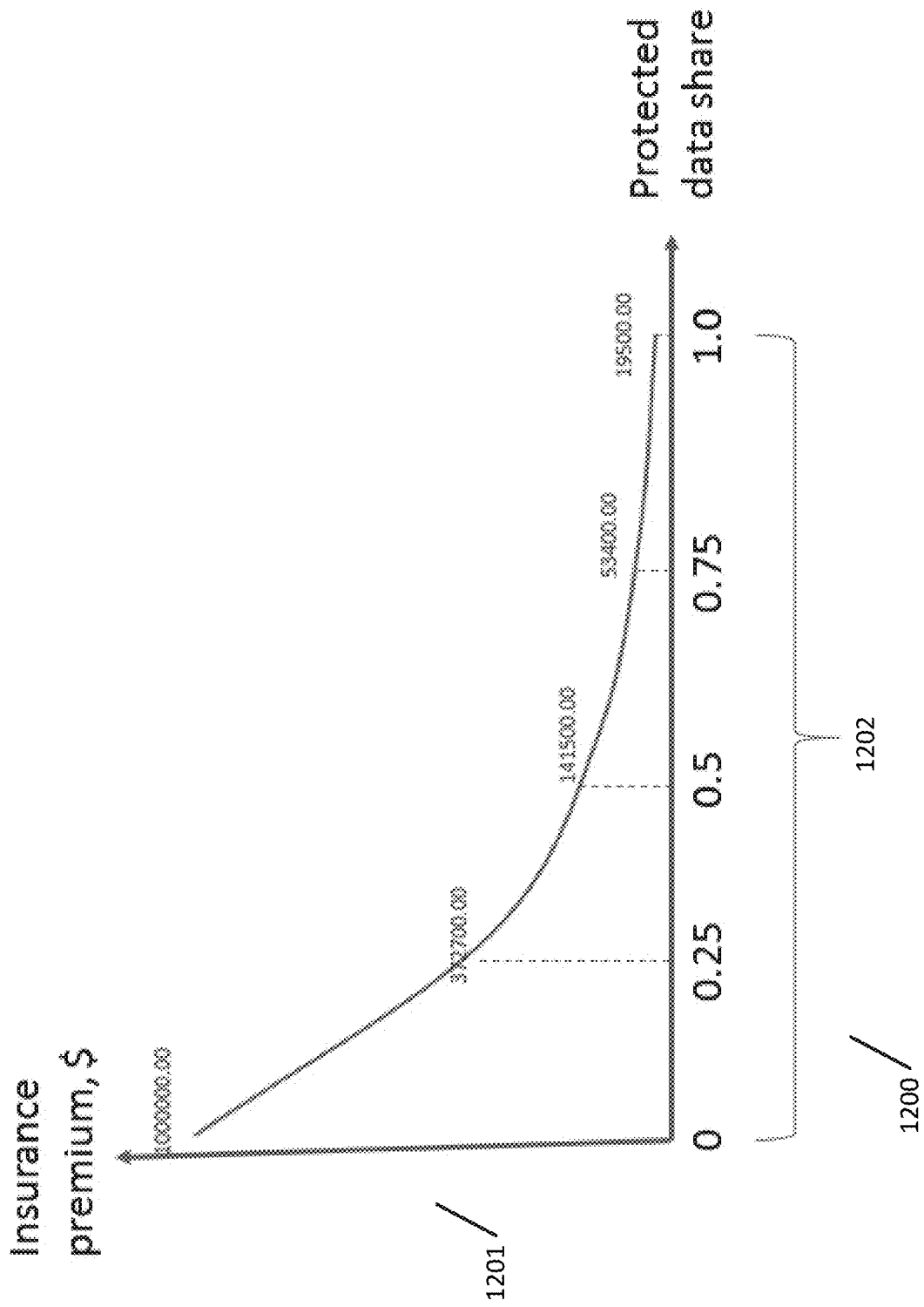
FIG. 12 illustrates a chart showing the insurance premium computation estimation 1 based on a standard exponential utility function according to an exemplary embodiment.

FIG. 12 illustrates a chart 1200 showing the insurance premium computation estimation 1201 based on a standard exponential utility function 1202, given by $u(w)=e^{-\alpha w}$ where w is interpreted as a share of protected data and $\alpha > 0$ is a degree of insurer's risk aversion. The degree of insurer's risk aversion, $\alpha = 3.91$, can be computed to satisfy boundary conditions such that unprotected data cannot be insured and the amount of annual premium for a fully protected data is $19,500 as estimated above.

Further referring to FIG. 12, the condition of uninsured data corresponds to a zero-protected data share. Under this condition the insurance premium is equal to the insurance payout. Insurance premiums corresponding to a plurality of protected data share values can be computed using said insurer's risk aversion degree.

Returning to FIG. 1, at step 104 an optimal data breach and mitigation scenario in the plurality of data breach and mitigation scenarios is determined based at least in part on the overall impact corresponding to each data breach and mitigation scenario. The optimal data breach and mitigation scenario can be the data breach and mitigation scenario with smallest impact (e.g., lowest overall monetary and resource costs including protection expenses, computational resources, personnel resources and/or damages/liabilities) or can be customized according to an analyst's preferences.

Figure 13:
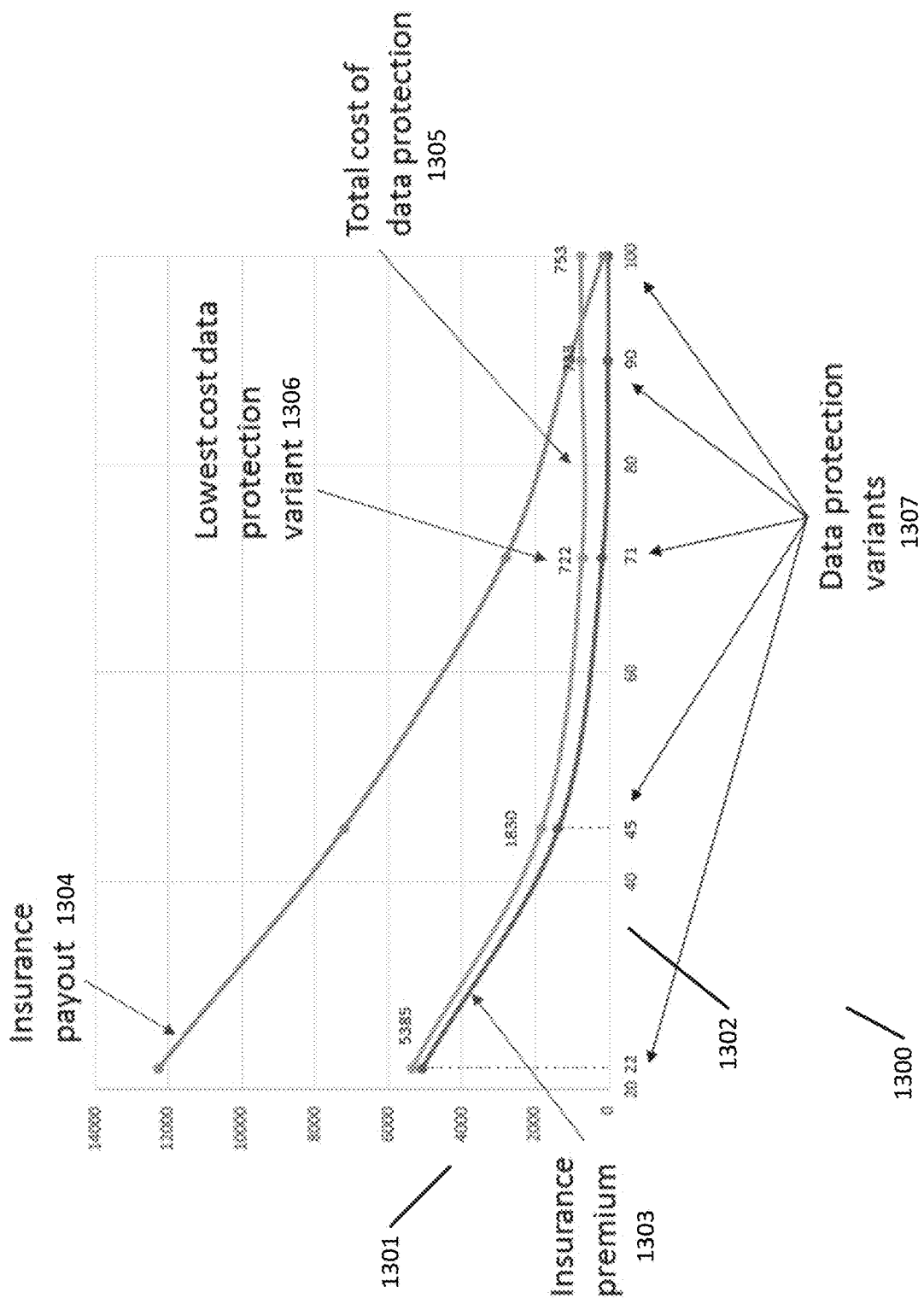
FIG. 13 illustrates a chart showing the determination of an optimal data breach and mitigation scenario and associated values for an example enterprise according to an exemplary embodiment.

FIG. 13 illustrates a chart 1300 showing the determination of an optimal data breach and mitigation scenario and associated values for an example enterprise according to an exemplary embodiment. The chart 1300 includes axis 1301 corresponding to increasing monetary amounts (in units of thousands) and axis 1302 corresponding to a level of protection among the plurality of data stores in the enterprise.

Further referring to FIG. 13, an exemplary matrix containing the counts of records subject to regulatory treatment is decomposed, five singular values are determined and five approximation matrices are computed. Each computed approximation matrix corresponds to one of the Data protection variants 1307 which call for protecting 22, 45, 71, 90 and 100 data stores respectively. For each of the data protection variants 1307 total cost of data protection 1305 includes the cost of cryptographic devices such as key management servers, cryptographic software for encrypting or tokenizing the data, operational expenses, revenue loss due to customer desertion and data breach insurance premium. It is appreciated that other expenses, without limitation, may be included in the total cost of protection.

Further referring to FIG. 13, for each data protection variant 1307 a corresponding insurance payout 1304 is computed and the insurance premium 1303 is estimated. Based on these computations, the total cost of data protection 1305 is calculated and a lowest cost data protection variant 1306 is determined. In this example a minimal cost of enterprise data protection is achieved when approximately 71% of regulated data is protected and the cost of data breach mitigation is estimated at $722,000.

FIG. 14 illustrates an example of the optimal data breach and mitigation scenario determination comparison in a tabular format according to an exemplary embodiment. Information about the company, including data stores, is shown in table 1400, potential liabilities are shown in table 1401, and the result of the simulation and analysis process is shown in table 1402.

For illustration and without any limitation, the enterprise's annual revenue is assumed to be $5,000,000,000, its assets assumed to amount to $500,000,000, and the enterprise is assumed to keep data subject to regulatory compliance in 100 data stores. Utilizing the RAND Corporation liability computation model, total liability is estimated at $20,000,000 (=0.4% of annual revenue).

As part of the simulation and analysis process, a matrix containing the counts of records subject to regulatory treatment is decomposed, five singular values are determined and five approximation matrices are computed. As shown in table 1402, each computed approximation matrix corresponds to one of the data protection variants which call for protecting 22, 45, 71, 90 and 100 data stores respectively. For each of the data protection variants total liability cost is comprised of cost of cryptographic devices such as key management servers, cryptographic software for encrypting or tokenizing the data, operational expenses, revenue loss due to customer desertion and data breach insurance premium. It is appreciated that other expenses, without limitation, may be included in the total liability cost.

Also shown in FIG. 14, for each data protection variant a corresponding Insurance payout is computed and an insurance premium is estimated. Based on these computations, a total cost of data protection is calculated and a lowest cost data protection variant is determined. In this example a minimal cost of enterprise data protection is achieved when approximately 70% of regulated data is protected and the cost of data breach mitigation is estimated at $722,000.

In addition to presenting information to an analyst regarding the optimal data breach and mitigation scenario and settings, the present system can generate and display an interactive user interface (UI) that allows analysts and other users to explore the universe of options for data breach protection and mitigation, customized to their enterprise's data stores, their unique circumstances, and the relevant governing regulations.

Figure 15:
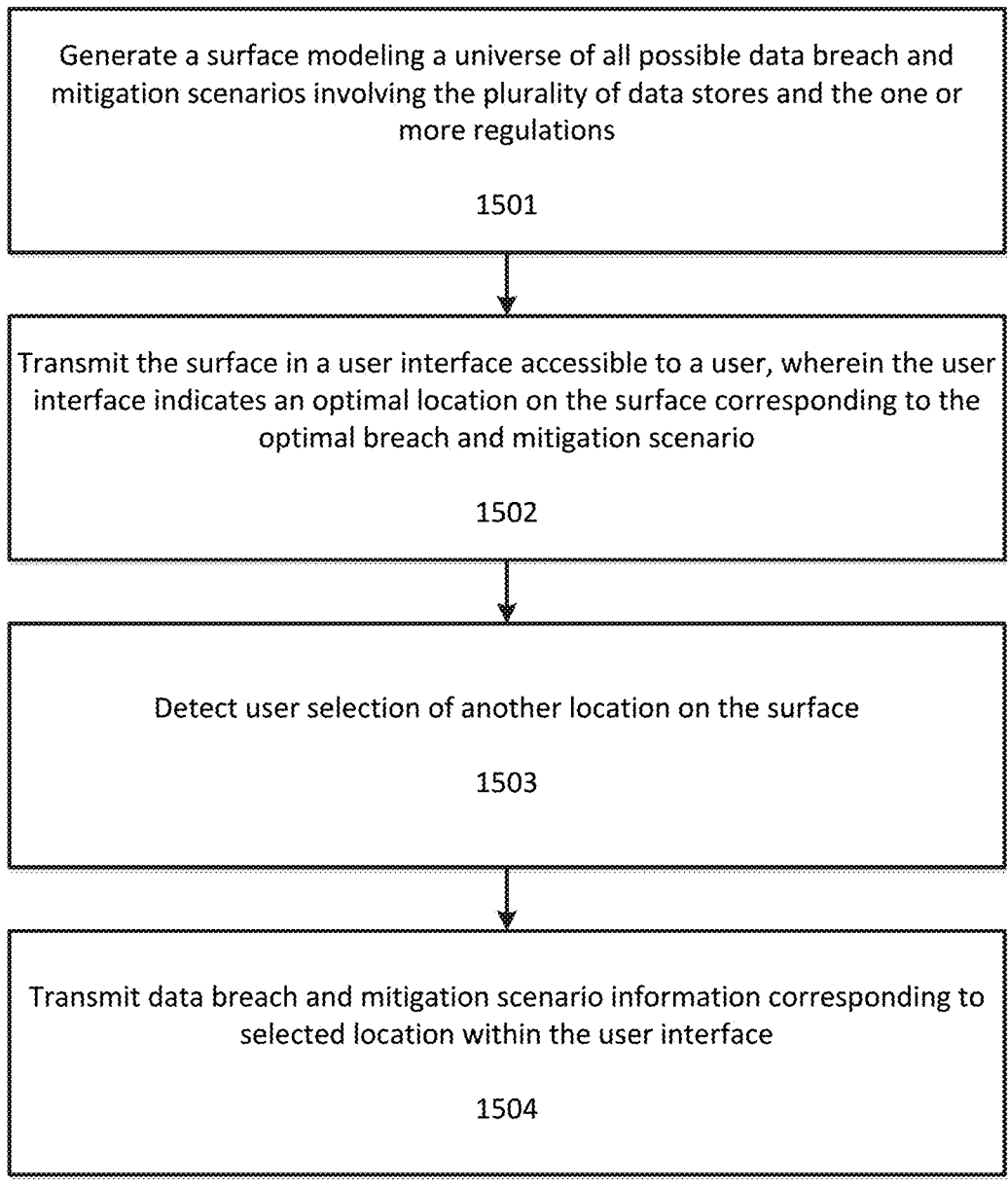
FIG. 15 illustrates a flowchart for presenting breach and mitigation scenario information to a user within a user interface according to an exemplary embodiment.

FIG. 15 illustrates a flowchart for presenting breach and mitigation scenario information to a user within a user interface according to an exemplary embodiment. The user interface can be part of a client computing device within the network. Additionally, the processing described in FIG. 15 can be performed on a client-side device or can also be performed server side and then transmitted to a user at a client for display and interactivity.

At step 1501 a surface modeling a universe of all possible data breach and mitigation scenarios involving the plurality of data stores and the one or more regulations is generated. The surface can be generated as user interface construct or data structure, or can be generated and modeled on a backend prior to display within an interface.

At step 1502 the surface is transmitted in a user interface accessible to a user. The surface can be transmitted as a shape or object within the UI, such as a two-dimensional surface within a three-dimensional space. The user interface or the surface itself can indicate an optimal location on the surface corresponding to the optimal breach and mitigation scenario.

At step 1503 user selection of another location on the surface can be detected. This selection can be made using a pointing device, touch screen, or other method of input.

At step 1504 data breach and mitigation scenario information corresponding to selected location is transmitted within the user interface. Thus, the user can explore the overall impact of any arrangement of protection and liability in order to make an assessment regarding the configuration most suited to their needs.

Figure 16:
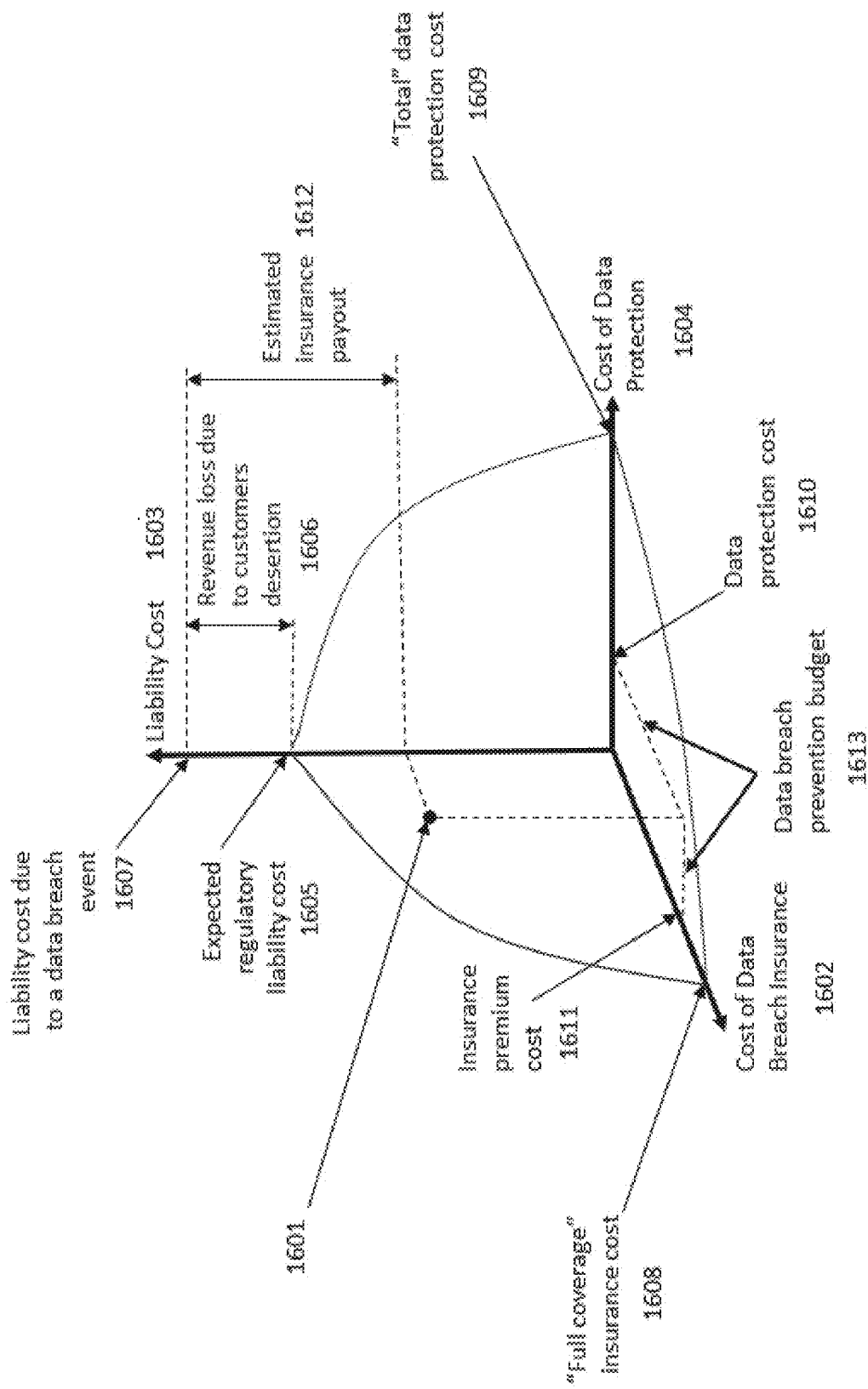
FIG. 16 illustrates an example of the manifold as it can be displayed within the UI according to an exemplary embodiment.

FIG. 16 illustrates an example of the surface 1601 as it can be displayed within the UI 1600. As shown in FIG. 16, the surface 1601 can indicate the universe of discourse and can be modeled in a 3-dimensional space formed by axes corresponding to the cost of data breach insurance 1602, liability cost 1603 and cost of data protection 604.

Liability cost due to a data breach event 1607 is comprised of expected regulatory liability cost 1605 and revenue loss due to customer desertion 1606 because of said data breach event.

Surface 1601 can reside on three extremes each situated on a respective axis. The three extremes are "full coverage" insurance cost 1608, "total" data protection cost 1609 and expected regulatory liability cost 1605. The "full coverage" insurance cost 1608 extreme corresponds to a scenario when the data owner takes insurance sufficient to cover the expected regulatory liability cost 1605 without any data protection expense. "Full coverage" insurance cost 1608 can be estimated based on the liability cost due to a data breach event 1607 rather than on the expected regulatory liability cost 1605.

In the "total" data protection cost 1609 extreme scenario the data owner ensures complete protection of the data assets such that data breach insurance is not required.

In yet another extreme scenario, the data owner accepts full responsibility for any potential data breach and is willing to cover the expected regulatory liability cost 1605 out of pocket and accept revenue loss due to customer desertion 1606.

Under a regular scenario, each point on the surface 1601 corresponds to a simulation of a data breach and mitigation. By moving over the surface 1601 the data owner can locate a most desirable combination of the data protection cost 1610 and the insurance premium cost 1611 which yields an estimated insurance payout 1612 sufficient to cover liability cost due to a data breach event 1607. It is appreciated that data owner may also locate a combination of the data protection cost 1610 and the insurance premium cost 1611 which yields an estimated insurance payout 1612 sufficient to cover the expected regulatory liability cost 1605 only.

As shown in FIG. 16, the present system enables computation of data owner data breach prevention budget 1613 as a function of the data protection cost 1610 and the Insurance premium cost 1611.

The novel methods and systems disclosed in this application enable simulation of data breach and mitigation scenarios and computation of a substantiated optimal budget for calculating expenses associated with prevention and mitigation of data breach incidents including but not limited to the costs incurred by data protection efforts, the cost of lost revenue, the cost of potential penalties and the cost of a data breach insurance. The disclosed system presents a data security officer with a variety of scenarios differing in the degree of personal data breach protection coverage from which said data security officer can select a scenario optimal in the current environment.

The novel approach to estimating data breach and mitigation impact disclosed herein enables computation of data protection impacts and costs by engaging several data protection scenarios each of which corresponds to protecting enterprise data as determined by successive approximations of the original data disposition in the enterprise data stores. More specifically this novel approach indicates the effect of protecting certain enterprise data stores on the overall cost of a potential data breach event. Furthermore, the novel approach disclosed herein allows optimization of the cost related to a potential data breach by simulating the impact and costs data protection, the impact and costs of data breach insurance, and other measures related to protection and mitigation.

Figure 17:
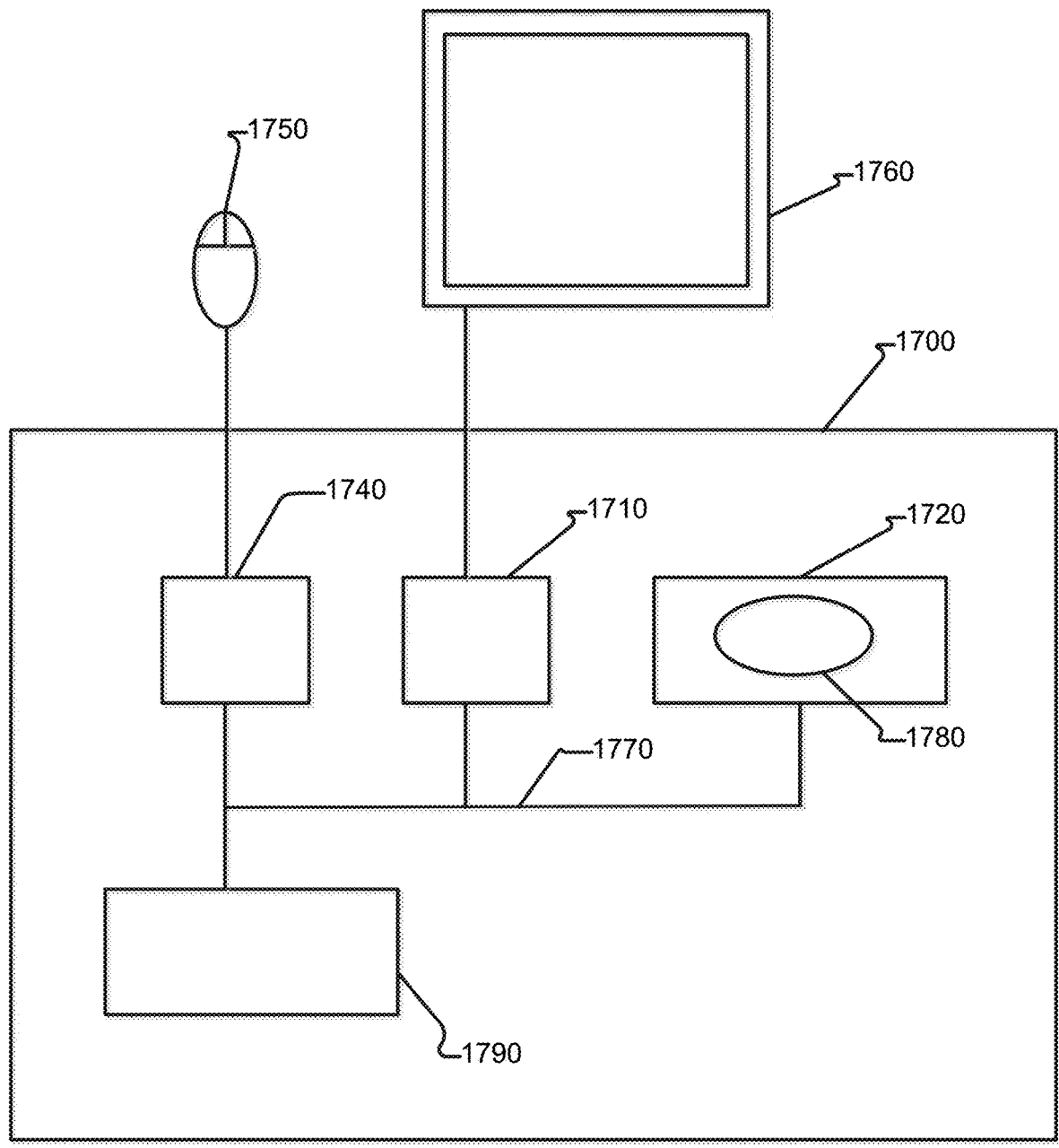
FIG. 17 illustrates an exemplary computing environment that can be used to carry out methods for data breach simulation and impact analysis.

One or more of the above-described techniques can be implemented in or involve one or more special-purpose computer systems having computer-readable instructions loaded thereon that enable the computer system to implement the above-described techniques. FIG. 17 illustrates an example of a computing environment 1700. The computing environment 1700 is not intended to suggest any limitation as to scope of use or functionality of a described embodiment(s).

With reference to FIG. 17, the computing environment 1700 includes at least one processing unit 1710 and memory 1720. The processing unit 1710 executes computer-executable instructions and can be a real or a virtual processor. In a multi-processing system, multiple processing units execute computer-executable instructions to increase processing power. The memory 1720 can be volatile memory (e.g., registers, cache, RAM), non-volatile memory (e.g., ROM, EEPROM, flash memory, etc.), or some combination of the two. The memory 1720 can store software 1780 implementing described techniques.

A computing environment can have additional features. For example, the computing environment 1700 includes storage 1740, one or more input devices 1750, one or more output devices 1760, and one or more communication connections 1790. An interconnection mechanism 1770, such as a bus, controller, or network interconnects the components of the computing environment 1700. Typically, operating system software or firmware (not shown) provides an operating environment for other software executing in the computing environment 1700, and coordinates activities of the components of the computing environment 1700.

The storage 1740 can be removable or non-removable, and includes magnetic disks, magnetic tapes or cassettes, CD-ROMs, CD-RWs, DVDs, or any other medium which can be used to store information and which can be accessed within the computing environment 1700. The storage 1740 can store instructions for the software 1780.

The input device(s) 1750 can be a touch input device such as a keyboard, mouse, pen, trackball, touch screen, or game controller, a voice input device, a scanning device, a digital camera, remote control, or another device that provides input to the computing environment 1700. The output device(s) 1760 can be a display, television, monitor, printer, speaker, or another device that provides output from the computing environment 1700.

The communication connection(s) 1790 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the context of computer-readable media. Computer-readable media are any available media that can be accessed within a computing environment. By way of example, and not limitation, within the computing environment 1700, computer-readable media include memory 1720, storage 1740, communication media, and combinations of any of the above.

Of course, FIG. 17 illustrates computing environment 1700, display device 1760, and input device 1750 as separate devices for ease of identification only. Computing environment 1700, display device 1760, and input device 1750 can be separate devices (e.g., a personal computer connected by wires to a monitor and mouse), can be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 1700 can be a set-top box, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

We claim:

1. A method executed by one or more computing devices for data breach simulation and impact analysis in a computer network, the method comprising:

generating, by at least one computing device on the computer network, an exposure matrix corresponding to a plurality of data stores connected to the computer network, the exposure matrix storing a correspondence between one or more regulations and an exposure of each data store in the plurality of data stores to the one or more regulations;

generating, by the at least one computing device on the computer network, a plurality of approximation matrices from the exposure matrix by iteratively applying a data compression algorithm to the exposure matrix, each successive iteration of the data compression algorithm being configured to more closely approximate the exposure matrix than a previous iteration of the data compression algorithm;

simulating, by the at least one computing device on the computer network, a plurality of data breach and mitigation scenarios on the plurality of data stores based at least in part on the plurality of approximation matrices to determine an overall impact of each data breach and mitigation scenario; and determining, by the at least one computing device on the computer network, an optimal data breach and mitigation scenario in the plurality of data breach and mitigation scenarios based at least in part on the overall impact corresponding to each data breach and mitigation scenario.

2. The method of claim 1, wherein the exposure matrix stores a correspondence between the one or more regulations and a quantity of records on each data store subject to the one or more regulations.

3. The method of claim 1, wherein the data compression algorithm comprises one of singular value decomposition (SVD), Batson-Spielman-Srivastava (BSS) sampling, or CUR matrix approximation.

4. The method of claim 1, wherein simulating a plurality of data breach and mitigation scenarios on the plurality of data stores based at least in part on the plurality of approximation matrices to determine an overall impact of each data breach and mitigation scenario comprises, for each approximation matrix in the plurality of approximation matrices:

simulating a protection impact corresponding to one or more protections costs associated with protecting records stored on the plurality of data stores that are identified in the approximation matrix;

simulating a liability impact corresponding to one or more liability costs associated with a data breach of unprotected records stored on the plurality of data stores that are not identified in the approximation matrix; and determining an overall impact of a data breach and mitigation scenario corresponding to the approximation matrix based at least in part on the protection impact and the liability impact.

5. The method of claim 4, wherein simulating a protection impact comprises determining one or more of: a hardware expense associated with protecting records identified in the approximation matrix, a software expense associated with protecting records identified in the approximation matrix, or an operational expense associated with protecting records identified in the approximation matrix.

6. The method of claim 4, wherein simulating a liability impact comprises determining one or more of: a regulatory expense associated with a breach of the unprotected records, an insurance premium corresponding to insurance coverage for the unprotected records, or revenue loss due to customer desertion.

7. The method of claim 1, further comprising:
generating, by the at least one computing device on a computer network, a surface modeling a universe of all possible data breach and mitigation scenarios involving the plurality of data stores and the one or more regulations;
transmitting, by the at least one computing device on a computer network, the surface in a user interface accessible to a user, wherein the user interface indicates an optimal location on the surface corresponding to the optimal breach and mitigation scenario;
detecting, by the at least one computing device on a computer network, user selection of another location on the surface; and
transmitting, by the at least one computing device on a computer network, data breach and mitigation scenario information corresponding to selected location within the user interface.

8. An apparatus for data breach simulation and impact analysis in a computer network, the apparatus comprising:
one or more processors; and
one or more memories operatively coupled to at least one of the one or more processors and having instructions stored thereon that, when executed by at least one of the one or more processors, cause at least one of the one or more processors to:
generate an exposure matrix corresponding to a plurality of data stores connected to the computer network, the exposure matrix storing a correspondence between one or more regulations and an exposure of each data store in the plurality of data stores to the one or more regulations;
generate a plurality of approximation matrices from the exposure matrix by iteratively applying a data compression algorithm to the exposure matrix, each successive iteration of the data compression algorithm being configured to more closely approximate the exposure matrix than a previous iteration of the data compression algorithm;
simulate a plurality of data breach and mitigation scenarios on the plurality of data stores based at least in part on the plurality of approximation matrices to determine an overall impact of each data breach and mitigation scenario; and
determine an optimal data breach and mitigation scenario in the plurality of data breach and mitigation scenarios based at least in part on the overall impact corresponding to each data breach and mitigation scenario.

9. The apparatus of claim 8, wherein the exposure matrix stores a correspondence between the one or more regulations and a quantity of records on each data store subject to the one or more regulations.

10. The apparatus of claim 8, wherein the instructions that, when executed by at least one of the one or more processors, cause at least one of the one or more processors to simulate a plurality of data breach and mitigation scenarios on the plurality of data stores based at least in part on the plurality of approximation matrices to determine an overall impact of each data breach and mitigation scenario further cause at least one of the one or more processors to, for each approximation matrix in the plurality of approximation matrices:

simulate a protection impact corresponding to one or more protections costs associated with protecting records stored on the plurality of data stores that are identified in the approximation matrix;
simulate a liability impact corresponding to one or more liability costs associated with a data breach of unprotected records stored on the plurality of data stores that are not identified in the approximation matrix; and
determine an overall impact of a data breach and mitigation scenario corresponding to the approximation matrix based at least in part on the protection impact and the liability impact.

11. The apparatus of claim 10, wherein the instructions that, when executed by at least one of the one or more processors, cause at least one of the one or more processors to simulate a protection impact corresponding to one or more protections costs associated with protecting records stored on the plurality of data stores that are identified in the approximation matrix further cause at least one of the one or more processors to:
determine one or more of: a hardware expense associated with protecting records identified in the approximation matrix, a software expense associated with protecting records identified in the approximation matrix, or an operational expense associated with protecting records identified in the approximation matrix.

12. The apparatus of claim 11, wherein the instructions that, when executed by at least one of the one or more processors, cause at least one of the one or more processors to simulate a liability impact corresponding to one or more liability costs associated with a data breach of unprotected records stored on the plurality of data stores that are not identified in the approximation matrix further cause at least one of the one or more processors to:
determine one or more of: a regulatory expense associated with a breach of the unprotected records, an insurance premium corresponding to insurance coverage for the unprotected records, or revenue loss due to customer desertion.

13. The apparatus of claim 8, wherein at least one of the one or more memories has further instructions stored thereon that, when executed by at least one of the one or more processors, cause at least one of the one or more processors to:
generate a surface modeling a universe of all possible data breach and mitigation scenarios involving the plurality of data stores and the one or more regulations;
transmit the surface in a user interface accessible to a user, wherein the user interface indicates an optimal location on the surface corresponding to the optimal breach and mitigation scenario;
detect user selection of another location on the surface; and
transmit data breach and mitigation scenario information corresponding to selected location within the user interface.

14. At least one non-transitory computer-readable medium storing computer-readable instructions that, when executed by one or more computing devices, cause at least one of the one or more computing devices to:
generate an exposure matrix corresponding to a plurality of data stores connected to the computer network, the exposure matrix storing a correspondence between one or more regulations and an exposure of each data store in the plurality of data stores to the one or more regulations;

generate a plurality of approximation matrices from the exposure matrix by iteratively applying a data compression algorithm to the exposure matrix, each successive iteration of the data compression algorithm being configured to more closely approximate the exposure matrix than a previous iteration of the data compression algorithm;

simulate a plurality of data breach and mitigation scenarios on the plurality of data stores based at least in part on the plurality of approximation matrices to determine an overall impact of each data breach and mitigation scenario; and determine an optimal data breach and mitigation scenario in the plurality of data breach and mitigation scenarios based at least in part on the overall impact corresponding to each data breach and mitigation scenario.

15. The at least one non-transitory computer-readable medium of claim 14, wherein the exposure matrix stores a correspondence between the one or more regulations and a quantity of records on each data store subject to the one or more regulations.

16. The at least one non-transitory computer-readable medium of claim 14, wherein the instructions that, when executed by at least one of the one or more computing devices, cause at least one of the one or more computing devices to simulate a plurality of data breach and mitigation scenarios on the plurality of data stores based at least in part on the plurality of approximation matrices to determine an overall impact of each data breach and mitigation scenario further cause at least one of the one or more computing devices to, for each approximation matrix in the plurality of approximation matrices:

simulate a protection impact corresponding to one or more protections costs associated with protecting records stored on the plurality of data stores that are identified in the approximation matrix;

simulate a liability impact corresponding to one or more liability costs associated with a data breach of unprotected records stored on the plurality of data stores that are not identified in the approximation matrix; and determine an overall impact of a data breach and mitigation scenario corresponding to the approximation matrix based at least in part on the protection impact and the liability impact.

17. The at least one non-transitory computer-readable medium of claim 16, wherein the instructions that, when executed by at least one of the one or more computing devices, cause at least one of the one or more computing devices to simulate a protection impact corresponding to one or more protections costs associated with protecting records stored on the plurality of data stores that are identified in the approximation matrix further cause at least one of the one or more computing devices to:

determine one or more of: a hardware expense associated with protecting records identified in the approximation matrix, a software expense associated with protecting records identified in the approximation matrix, or an operational expense associated with protecting records identified in the approximation matrix.

18. The at least one non-transitory computer-readable medium of claim 16, wherein the instructions that, when executed by at least one of the one or more computing devices, cause at least one of the one or more computing devices to simulate a liability impact corresponding to one or more liability costs associated with a data breach of unprotected records stored on the plurality of data stores that are not identified in the approximation matrix further cause at least one of the one or more computing devices to:

determine one or more of: a regulatory expense associated with a breach of the unprotected records, an insurance premium corresponding to insurance coverage for the unprotected records, or revenue loss due to customer desertion.

19. The at least one non-transitory computer-readable medium of claim 14, further storing computer-readable instructions that, when executed by at least one of the one or more computing devices, cause at least one of the one or more computing devices to:

generate a surface modeling a universe of all possible data breach and mitigation scenarios involving the plurality of data stores and the one or more regulations;

transmit the surface in a user interface accessible to a user, wherein the user interface indicates an optimal location on the surface corresponding to the optimal breach and mitigation scenario;

detect user selection of another location on the surface; and transmit data breach and mitigation scenario information corresponding to selected location within the user interface.

* * * * *